US011653015B2

(12) United States Patent
Miyazawa et al.

(10) Patent No.: US 11,653,015 B2
(45) Date of Patent: May 16, 2023

(54) PREDICTION APPARATUS, PREDICTION METHOD AND PROGRAM

(71) Applicant: NIPPON TELEGRAPH AND TELEPHONE CORPORATION, Tokyo (JP)

(72) Inventors: Takehito Miyazawa, Musashino (JP); Yukihiro Bando, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/295,121

(22) PCT Filed: Nov. 18, 2019

(86) PCT No.: PCT/JP2019/045026
§ 371 (c)(1),
(2) Date: May 19, 2021

(87) PCT Pub. No.: WO2020/105576
PCT Pub. Date: May 28, 2020

(65) Prior Publication Data
US 2022/0021897 A1  Jan. 20, 2022

(30) Foreign Application Priority Data
Nov. 21, 2018  (JP) .............................. JP2018-218459

(51) Int. Cl.
*H04N 7/12* (2006.01)
*H04N 19/513* (2014.01)
(Continued)

(52) U.S. Cl.
CPC ......... *H04N 19/513* (2014.11); *H04N 19/105* (2014.11); *H04N 19/176* (2014.11); *H04N 19/597* (2014.11)

(58) Field of Classification Search
CPC .. H04N 19/513; H04N 19/105; H04N 19/176; H04N 19/597; H04N 19/52
(Continued)

(56) References Cited

U.S. PATENT DOCUMENTS

2006/0045186 A1\* 3/2006 Koto .................... H04N 19/152
375/E7.149
2008/0080617 A1\* 4/2008 Kodama ................ H04N 19/56
375/E7.125
(Continued)

OTHER PUBLICATIONS

Madhukar Budagavi and Do-Kyoung Kwon, AHG8: Video coding using Intra motion compensation, Joint Collaborative Team on Video Coding (JCT-VC), Apr. 2013.
(Continued)

*Primary Examiner* — Gims S Philippe

(57) ABSTRACT

A prediction device for predicting a motion vector of a coding target block in coding of a composite image formed by combining multiple viewpoint images includes: a storage unit that stores a first predicted motion vector indicating a predicted motion vector candidate; and an update unit that if a predetermined condition is met, generates a second predicted motion vector that is a vector indicating a pixel in an adjacent viewpoint, the pixel being located at a position that is same as a position of the coding target block, and stores the second predicted motion vector the storage unit.

10 Claims, 6 Drawing Sheets

(51) Int. Cl.
*H04N 19/105* (2014.01)
*H04N 19/176* (2014.01)
*H04N 19/597* (2014.01)

(58) Field of Classification Search
USPC .................................................... 375/240.12
See application file for complete search history.

(56) References Cited

U.S. PATENT DOCUMENTS

| | | | | |
|---|---|---|---|---|
| 2011/0255592 | A1* | 10/2011 | Sung | H04N 7/24 375/E7.141 |
| 2011/0317930 | A1* | 12/2011 | Kim | H04N 19/103 382/233 |
| 2013/0022123 | A1* | 1/2013 | Ueda | H04N 19/52 375/E7.123 |
| 2013/0128979 | A1 | 5/2013 | Jones et al. | |
| 2014/0185686 | A1* | 7/2014 | Wu | H04N 19/577 375/240.16 |
| 2018/0302641 | A1* | 10/2018 | Ikai | H04N 19/593 |
| 2019/0110058 | A1* | 4/2019 | Chien | H04N 19/52 |
| 2019/0335181 | A1* | 10/2019 | Abe | H04N 19/119 |
| 2020/0029087 | A1* | 1/2020 | Lim | H04N 19/119 |

OTHER PUBLICATIONS

Munekazu Date et al., Real-time viewpoint image synthesis using strips of multi-camera images, SPIE-IS&T, Mar. 17, 2015.

Munekazu Date et al., Visually equivalent light field flat panel 3D display, Proceedings of the 22nd Annual Meeting of the Virtual Reality Society of Japan, Sep. 2017.

Li, Bin and Xu, Jizheng, Non-SCCE1: Unification of intra BC and inter modes, Joint Collaborative Team on Video Coding (JCT-VC), Jun. 30, 2014.

* cited by examiner

PREDICTION APPARATUS, PREDICTION METHOD AND PROGRAM

CROSS-REFERENCE TO RELATED APPLICATIONS

This application is a 371 U.S. National Phase of International Application No. PCT/JP2019/045026 filed on Nov. 18, 2019, which claims priority to Japanese Application No. 2018-218459 filed on Nov. 21, 2018. The entire disclosures of the above applications are incorporated herein by reference.

TECHNICAL FIELD

The present invention relates to a prediction device, a prediction method and a program.

BACKGROUND ART

In inter coding in H.265/HEVC (High Efficiency Video Coding), motion vector prediction (MVP) is performed and only a predicted motion vector difference is transmitted. Consequently, motion vector information necessary for decoding is efficiently transmitted. Predicted motion vectors are created in the following order of priority. First, a maximum of two predicted motion vectors are created in a spatial direction, and next, a maximum of one predicted motion vector is created in a temporal direction, and then, lastly, a zero vector is added. Here, a predicted motion vector in a spatial direction is a copy of a motion vector of a peripheral coded block. The order of priority for peripheral coded blocks, a motion vector of which is to be copied, is determined in advance based on a positional relationship between a coding target block and the coded blocks. Also, a predicted motion vector in a temporal direction is a copy of a motion vector in a coded block in a coded picture (reference picture), the coded block being located at a position that is the same (same coordinates) as that of a coding target block in a current picture. When two predicted motion vectors have been created, the motion vector prediction ends, and an index indicating which predicted motion vector of the two predicted motion vectors is used for prediction and a predicted difference are transmitted.

Also, as one of techniques each determined as an HEVC extension standard for screen contents, there is IBC (intra block copy). IBC is a technique that performs inter prediction using a coded area of a current picture as a reference picture (for example, Non-Patent Literature 1). Motion vector search and motion vector prediction in IBC are performed in a procedure that is similar to that of inter prediction in HEVC. However, a current picture is stored in a reference picture set as a long-term reference picture. Therefore, in IBC, unlike normal motion vector prediction, neither scaling of a predicted value of a motion vector according to a distance between frames is performed nor a motion vector based on a frame other than a current frame is used as a predicted value.

In order to provide a high level of realism, representation of smooth motion parallax is important. As a method for representation of motion parallax, there is multi-view display, which, however, involves switching of viewing spaces. In super multi-view display or high-density directional display with an enhanced directional density of multi-view display, motion parallax is smoothed; however, in order to represent continuous motion parallax, a large number of images are required. Therefore, a display technique that represents continuous motion parallax with a small number of images by linearly blending a plurality of images has been proposed. Linear blending is a technique that generates an image for a viewpoint located between adjacent two cameras (hereinafter referred to as "intermediate viewpoint") by performing linear interpolation of two images respectively picked up by the two cameras (for example, Non-Patent Literature 2). A display that provides glasses-free 3D (three-dimensional) display using linear blending is called a "linear blending display" (for example, Non-Patent Literature 3). A linear blending display can display different light rays depending on the viewpoint directions. A linear blending display generates images corresponding to intermediate viewpoints from multiple viewpoint images picked up by a camera array and outputs images according to positions of viewpoints. Consequently, a viewer can view an image corresponding to a position of a viewpoint that changes along with movement, enabling provision of a stereoscopic effect.

Note that an input to a linear blending display is, for example, as illustrated in FIG. 5, an image formed by combining multiple viewpoint images obtained by images for respective viewpoints be ng sub-sampled and then being vertically stacked. Also, FIG. 6 illustrates an example of a configuration of a linear blending display. As illustrated in the figure, for example, a multi-viewpoint image in which pixels forming respective light rays for viewpoint A, viewpoint B and viewpoint C are arranged in order is input to a liquid-crystal panel. Then, the configuration is made so that only respective corresponding light rays reach viewpoint A, viewpoint B and viewpoint C. Also, light rays for a plurality of viewpoints adjacent to each other are mixed at a mixture ratio according to a position of an intermediate viewpoint, thereby forming a light ray for the intermediate viewpoint. Consequently, a glasses-free stereoscopic view is provided. As illustrated in the figure, for example, a light ray for an intermediate viewpoint that is equally distant from viewpoint A and viewpoint B is a light ray in which the light ray for viewpoint A and the light ray for viewpoint B are mixed at a mixture ratio of 5:5.

CITATION LIST

Non-Patent Literature

Non-Patent Literature 1: M. Budagavi, et al., "AHG8: Video coding using Intra motion compensation," Joint Collaborative Team on Video Coding (JCT-VC) of ITU-T SC 16 WP 3 and ISO/IEC JTC 1/SC 29/WG 11, 13th Meeting: Incheon, Korea, 18-26 Apr. 2013.

Non-Patent Literature 2: M. Date et al., "Real-time viewpoint image synthesis using strips of multi-camera images," Proc. of SPIE-IS&T, Vol. 9391 939109-7, 17 Mar. 2015.

Non-Patent Literature 3: Munekazu Date, et al., "Flat Panel Visually-equivalent Light Field 3D Display", 22nd Conference Proceedings of the Virtual Reality Society of Japan, 1B4-04, September 2017.

SUMMARY OF THE INVENTION

Technical Problem

In the case of an image formed by combining multiple viewpoint images, in predictive coding, a block at a same position in an image for another viewpoint can be referred to, enabling making a prediction residual small.

In this case, a motion vector of the block at the same position in the image for the other viewpoint is considerably large in comparison with a normal temporal direction motion vector. Therefore, motion vector prediction is important. However, for example, in the part of a boundary between the foreground and the background, normal motion vector search and IBC mingle, and thus, motion vector prediction is not properly performed, causing the problem of an increase in code amount.

An object of the present invention, which has been made in view of such circumstances, is to provide a technique that enables efficient compression of an image formed combining multiple viewpoint images.

Means for Solving the Problem

An aspect of the present invention provides a prediction device for predicting a motion vector of a coding target block in coding of a composite image formed by combining multiple viewpoint images, the prediction device including: a storage unit that stores a first predicted motion vector indicating a predicted motion vector candidate; and an update unit that if a predetermined condition is met, generates a second predicted motion vector that is a vector indicating a pixel in an adjacent viewpoint, the pixel being located at a position that is same as a position of the coding ta block and stores the second predicted motion vector in the storage unit.

Also, an aspect of the present invention provides the above prediction device in which the predetermined condition is a condition that the composite image ii which the coding target block is included and a composite image referred to for generating the second predicted motion vector are a same composite image.

Also, an aspect of the present invention provides the above prediction device in which the predetermined condition is a condition that the coding target block is not a block included in an uppermost viewpoint in the composite image.

Also, an aspect of the present invention provides the above prediction device in which the predetermined condition is a condition that a viewpoint corresponding to a block that an adjacent block refers to for generating the first predicted motion vector and a viewpoint corresponding to an image to which the coding target block belongs are not adjacent to each other.

Also, an aspect of the present invention provides a prediction device for predicting a motion vector of a coding target block in coding of a composite image formed by combining multiple viewpoint images, the prediction device including: a storage unit that stores a first predicted motion vector indicating a predicted motion vector candidate; and an update unit that if there are a plurality of the first predicted motion vectors stored in the storage unit, generates a second predicted motion vector that is a vector indicating a pixel in an adjacent viewpoint, the pixel being located at a position that is same as a position of the coding target block, and overwrites one of the first predicted motion vectors, whichever is lower in priority, with the second predicted motion vector.

Also, an aspect of the present invention provides a prediction method for predicting a motion vector of a coding target block in coding of a composite image formed by combining multiple viewpoint images, the prediction method including: a storage step of storing a first predicted motion vector indicating a predicted motion vector candidate; and an update step of if a predetermined condition is met, generating a second predicted motion vector that is a vector indicating a pixel in an adjacent viewpoint, the pixel being located at a position that is same as a position of the coding target block, and storing the second predicted motion vector.

Also, an aspect of the present invention provides a program for causing a computer to function as the above prediction device.

Effects of the Invention

The present invention enables efficient compression of an image formed by combining multiple viewpoint images.

DESCRIPTION OF EMBODIMENTS

Embodiment

A prediction device, a prediction method and a program according to an embodiment of the present invention are intended to be used for coding of an image formed by combining multiple viewpoint images, and is characterized in that if a predetermined condition is met, one of two predicted motion vectors stored in advance, whichever is lower in priority, is overwritten with a motion vector indicating a block in an image for a viewpoint adjacent to a viewpoint corresponding to an image to which a coding target block belongs, the block being located at a position that is the same as that of the coding target block. The prediction device, the prediction method and the program according to an embodiment of the present invention will be described below with reference to the drawings.

[Configuration of Prediction Device]

Figure 1:
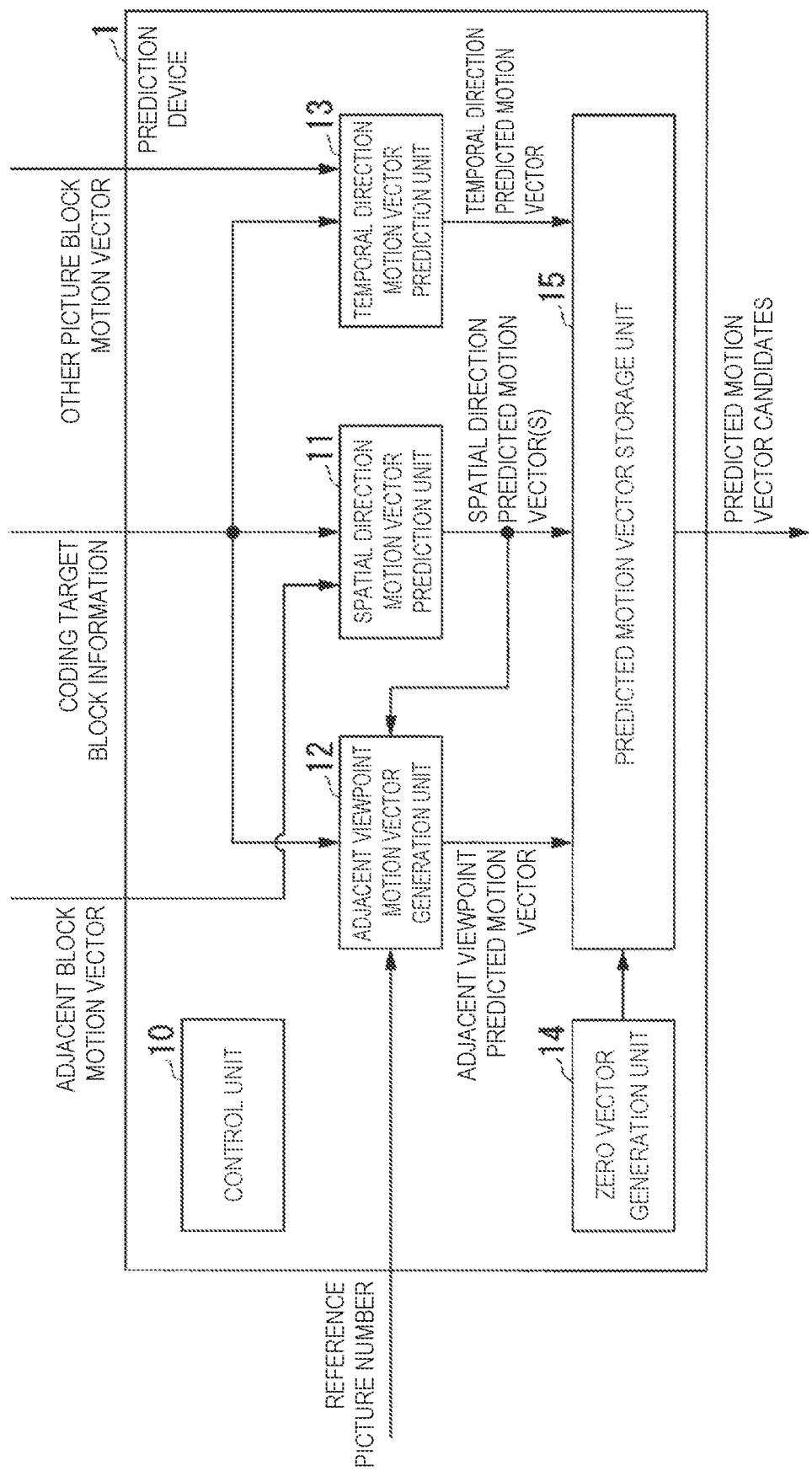
FIG. 1 is a block diagram illustrating a functional configuration of a prediction device 1 according to an embodiment of the present invention.

FIG. 1 is a block diagram illustrating a functional configuration of a prediction device 1 according to an embodiment of the present invention. As illustrated in FIG. 1, a prediction device 1 includes a control unit 10, a spatial direction motion vector prediction unit 11, an adjacent viewpoint motion vector generation unit 12, a temporal direction motion vector prediction unit. 13, a zero vector generation unit 14 and a predicted motion vector storage unit 15.

Information pieces to be input to the prediction device 1 according to the present embodiment are "coding target block information", an "adjacent block motion vector", an "other picture block motion vector" and a "reference picture number". The "coding target block information" is information representing coordinates of a coding target block. The "adjacent block motion vector" is a motion vector of a block adjacent to the coding target block. The "other picture block motion vector" is a motion vector of a block in a coded picture, the block being located at a position that is the same as a position of the coding target block in a current picture. The "reference picture number" is a number indicating a reference picture for the coding target block. Note that these input information pieces are information pieces that are similar to input information pieces to be used for motion vector prediction in H.265/HEVC.

Note that a configuration of a coding target image is determined in advance. In other words, a width of images for respective viewpoints included in a composed multi-view image is fixed over an entire GOP (group of pictures). Information indicating a configuration of a coding target image such as the above is transmitted, for example, in such a manner that the information is included in header information such as an SPS (sequence parameter set).

The control unit 10 controls operation of the respective functional blocks included in the prediction device 1. For example, the control unit 10 recognizes the number of predicted motion vectors stored in the predicted motion vector storage unit. 15 and controls operation of the respective functional blocks based on the number of predicted motion vectors (for example, by determining whether or not the number of predicted motion vectors is less than two).

The spatial direction motion vector prediction unit 11 acquires coding target block information and an adjacent block motion vector from an external device. The spatial direction motion vector prediction unit 11 performs spatial direction motion vector prediction based on the acquired coding target block information and the adjacent block motion vector under the control by the control unit 10. Consequently, as in the case of H.265/HEVC, a maximum of two predicted motion vectors in a spatial direction (hereinafter referred to as "spatial direction predicted motion vectors") are generated.

The spatial direction motion vector prediction unit 11 stores the generated spatial direction predicted motion vector(s) in the predicted motion vector storage unit 15. Also, the spatial direction motion vector prediction unit 11 outputs the generated spatial direction predicted motion vector (s) to the adjacent viewpoint motion vector generation unit 12.

The adjacent viewpoint motion vector generation unit 12 acquires the spatial direction predicted motion vector(s) output from the spatial direction motion vector prediction unit 11. Also, the adjacent viewpoint motion vector generation unit 12 acquires the coding target block information and a reference picture number from the external device. The adjacent viewpoint motion vector generation unit 12 performs adjacent viewpoint prediction based on the acquired spatial direction predicted motion vector, the acquired coding target block information and the acquired reference picture number. The adjacent viewpoint motion vector generation unit 12 updates the predicted motion vector (s) stored in the predicted motion vector storage unit 15, based on a prediction result of the adjacent viewpoint prediction. Note that a further detailed configuration of the adjacent viewpoint motion vector generation unit 12 and details of processing for the adjacent viewpoint prediction will be described later.

The temporal direction motion vector prediction unit 13 acquires the coding target block information and an other picture block motion vector from the external device. The temporal direction motion vector prediction unit 13 performs temporal direction motion vector prediction based on the acquired coding target block information and the acquired other picture block motion vector under the control by the control unit 10. Consequently, as in the case of H.265/HEVC, a maximum of one predicted motion vector in a temporal direction (hereinafter referred to as "temporal direction predicted motion vector") is generated. The temporal direction motion vector prediction unit 13 stores the generated temporal direction predicted motion vector in the predicted motion vector storage unit 15.

The zero vector generation unit 14 further stores a zero vector in the predicted motion vector storage unit 15 until the number of vectors (predicted motion vector candidates) stored in the predicted motion vector storage unit 15 becomes two, under the control by the control unit 10.

The predicted motion vector storage unit 15 stores the predicted motion vectors (hereinafter referred to as "predicted vector candidates") to be output to the external device. The predicted motion vector storage unit 15 is provided by, for example, a flash memory, a HDD (hard disk drive), an SDP (solid-state drive), a RAM (random access memory; readable and writable memory), a register or the like.

[Configuration of Adjacent Viewpoint Motion Vector Generation Unit]

The configuration of the adjacent viewpoint motion vector generation unit 12 will be described in further detail below.

Figure 2:
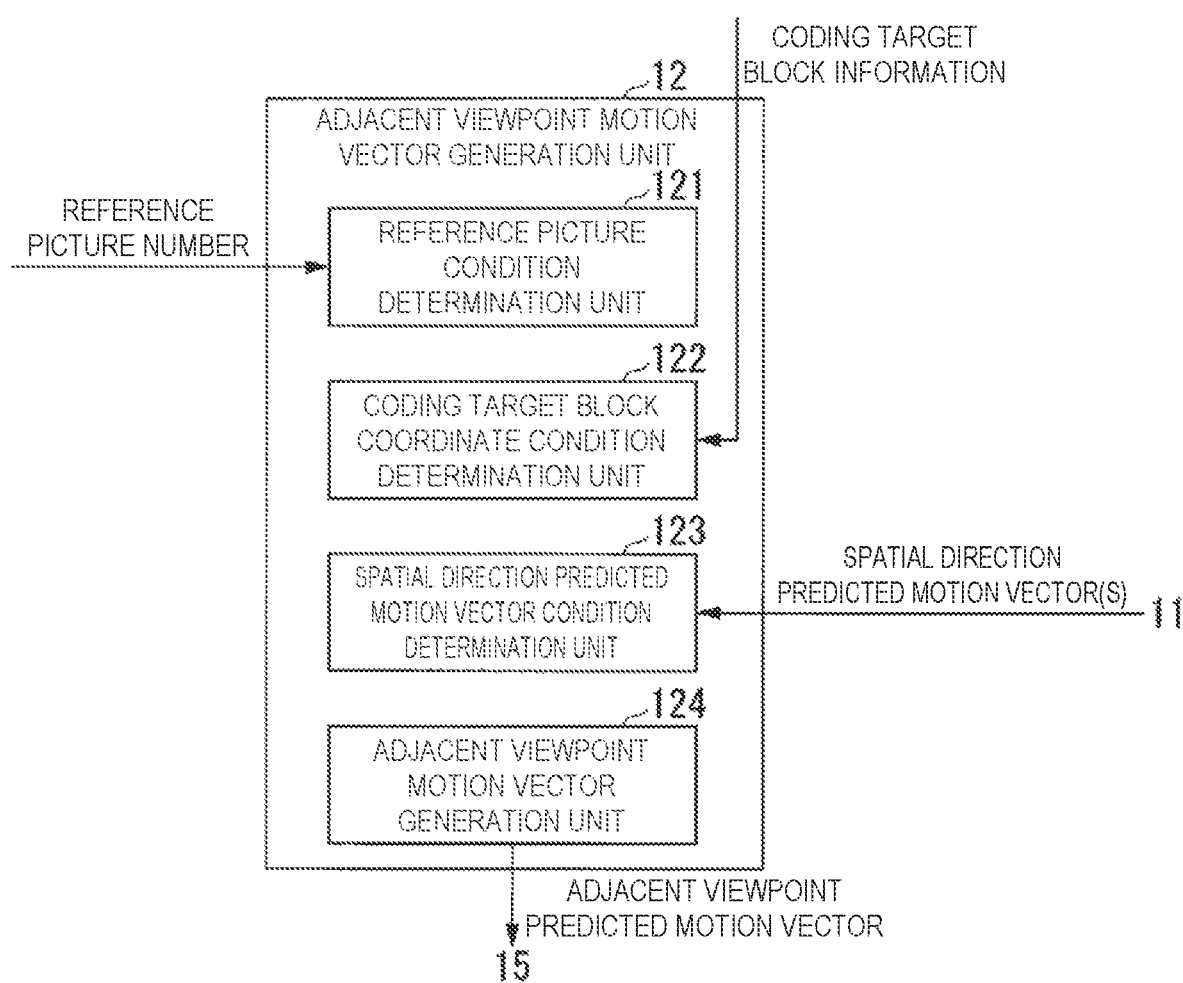
FIG. 2 is a block diagram illustrating a functional configuration of an adjacent viewpoint motion vector generation unit 12 in the prediction device 1 according to an embodiment of the present invention.

FIG. 2 is a block diagram illustrating a functional configuration of the adjacent viewpoint motion vector generation unit 12 in the prediction device 1 according to an embodiment of the present invention. As illustrated in FIG. 2, the adjacent viewpoint motion vector generation unit 12 includes a reference picture condition determination unit 121, a coding target block coordinate condition determination unit 122, a spatial direction predicted motion vector condition determination unit 123 and an adjacent viewpoint motion vector generation unit 124.

The reference picture condition determination unit 121 acquires a reference picture number. The reference picture condition determination unit 121 determines whether or not the acquired reference picture number is 0. A reference picture number being 0 means that a picture to which a coding target block belongs (current picture) is referred to, that is, a picture to which a coding target block belongs and a picture that is referred to are a same picture. Note that processing where the current picture is referred to is equivalent to performing IBC (intra block copy) mentioned above.

The coding target block coordinate condition determination unit 122 acquires coding target block information. If the below condition is met, the coding target block coordinate condition determination unit 122 determines whether or not the coding target block is a block included in an image corresponding to an uppermost viewpoint, based on the acquired coding target block information. Here, the condition is that the reference picture condition determination unit 121 determines that the current picture is referred to, that is, that the reference picture number is 0.

The spatial direction predicted motion vector condition determination unit 123 acquires spatial direction predicted motion vector(s). If the coding target block coordinate condition determination unit 122 determines that the coding target block is not a block included in an image corresponding to the uppermost viewpoint, the spatial direction predicted motion vector condition determination unit 123 determines whether or not the spatial direction predicted motion vector(s) refer to an adjacent viewpoint.

If the spatial direction predicted motion vector condition determination unit 123 determines that the spatial direction predicted motion vector(s) do not refer to an adjacent viewpoint, the adjacent viewpoint motion vector generation unit 124 generates an adjacent viewpoint predicted motion vector. In this case, is two spatial direction predicted motion vectors have already been stored in the predicted motion vector storage unit 15, the adjacent viewpoint motion vector generation unit 124 overwrites one of the two spatial direction predicted motion vectors, whichever is lower in priority (for example, a spatial direction predicted motion vector generated later), with the generated adjacent viewpoint predicted motion vector.

[Operation of Prediction Device]

Operation of the prediction device 1 will be described below.

Figure 3:
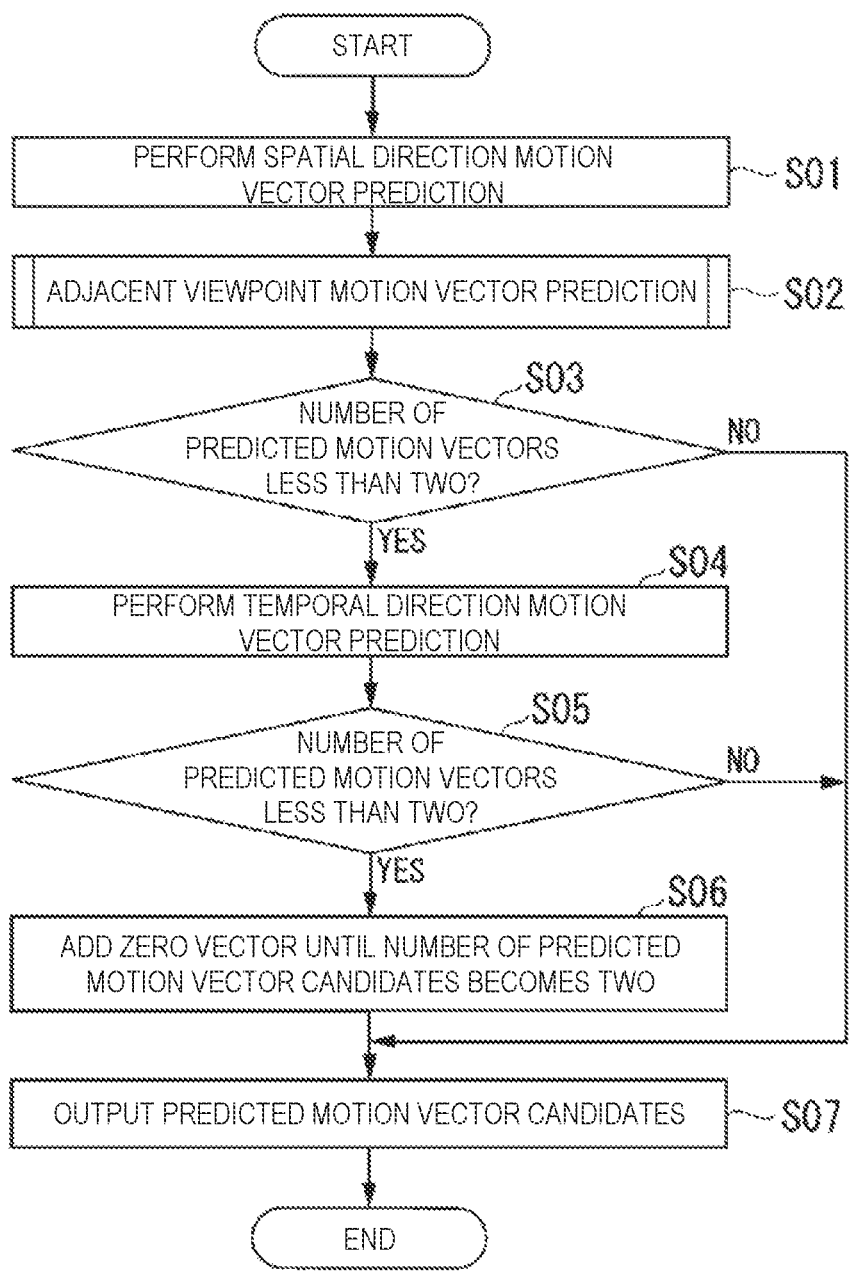
FIG. 3 is a flowchart illustrating operation of the prediction device 1 according to an embodiment of the present invention.

FIG. 3 is a flowchart illustrating operation of the prediction device 1 according to an embodiment of the present invention.

First, the spatial direction motion vector prediction unit 11 acquires coding target block information and an adjacent block motion vector. The spatial direction motion vector prediction unit 11 performs spatial direction motion vector prediction based on the acquired coding target block information and the acquired adjacent block motion vector (step S01). Consequently, a maximum of two spatial direction predicted motion vectors are generated. The spatial direction motion vector prediction unit 11 stores the generated spatial direction predicted motion vector (s) in the predicted motion vector storage unit 15.

The adjacent viewpoint motion vector generation unit 12 acquires the spatial direction predicted motion vector(s) generated by the spatial direction motion vector prediction unit 11. Also, the adjacent viewpoint motion vector generation unit 12 acquires the coding target block information and a reference picture number. The adjacent viewpoint motion vector generation unit 12 performs adjacent viewpoint prediction based on the spatial direction predicted motion vector(s), the coding target block information and the reference picture number (step S02).

The adjacent viewpoint prediction by the adjacent viewpoint motion vector generation unit 12 will be described in further detail below.

Figure 4:
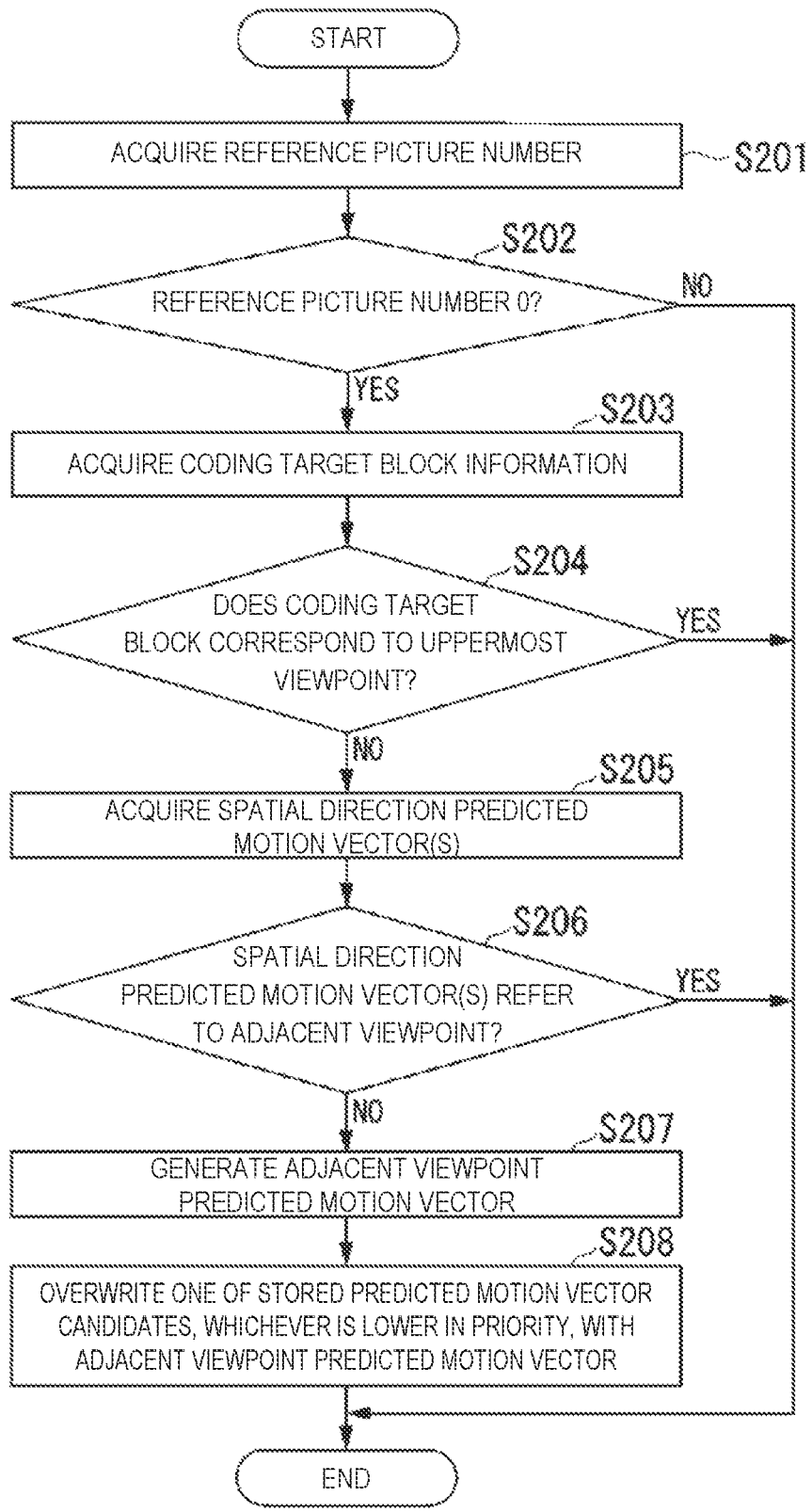
FIG. 4 is a flowchart illustrating operation of the adjacent viewpoint motion vector generation unit 12 in the prediction device 1 according to an embodiment of the present invention.

FIG. 4 is a flowchart illustrating operation of the adjacent viewpoint motion vector generation unit 12 in the prediction device according to an embodiment of the present invention.

First, the reference picture condition determination unit 121 acquires the reference picture number (step S201). The reference picture condition determination unit 121 determines whether or not the acquired reference picture number is 0 (step S202). If the reference picture condition determination unit 121 determines that the reference picture number is not 0 (step S202: NO), the adjacent viewpoint prediction processing ends.

On the other hand, if the reference picture condition determination unit 121 determines that the reference picture number 0 (step S202: YES), the coding target block coordinate condition determination unit 122 acquires the coding target block information (step S203). The coding target block coordinate condition determination unit 122 determines whether or not the coding target block is a block included in an image corresponding to the uppermost viewpoint, based the acquired coding target block information (step S204). If the coding target block coordinate condition determination unit 122 determines that the coding target block is a block included in an image corresponding to the uppermost viewpoint (step 3204: YES), the adjacent viewpoint prediction processing ends.

On the other hand, if the coding target block coordinate condition determination unit 122 determines that the coding target block not a block included in an image corresponding to the uppermost viewpoint (step S204: NO), the spatial direction predicted motion vector condition determination unit 123 acquires the spatial direction predicted motion vector(s) (step S205). The spatial direction predicted motion vector condition determination unit 123 determines whether or not the spatial direction predicted motion vector (s) refer to an adjacent viewpoint (step S206). If the spatial direction predicted motion vector condition determination unit 123 determines that the spatial direction predicted motion vector(s) refer to an adjacent viewpoint (step S206: YES), the adjacent viewpoint prediction processing ends.

On the other hand, if the spatial direction predicted motion vector condition determination unit 123 determines that the spatial direction predicted motion vector(S) do not refer to an adjacent viewpoint (step S206: NO), the adjacent viewpoint motion vector generation unit 124 generates an adjacent viewpoint predicted motion vector (step S207).

Figure 5:
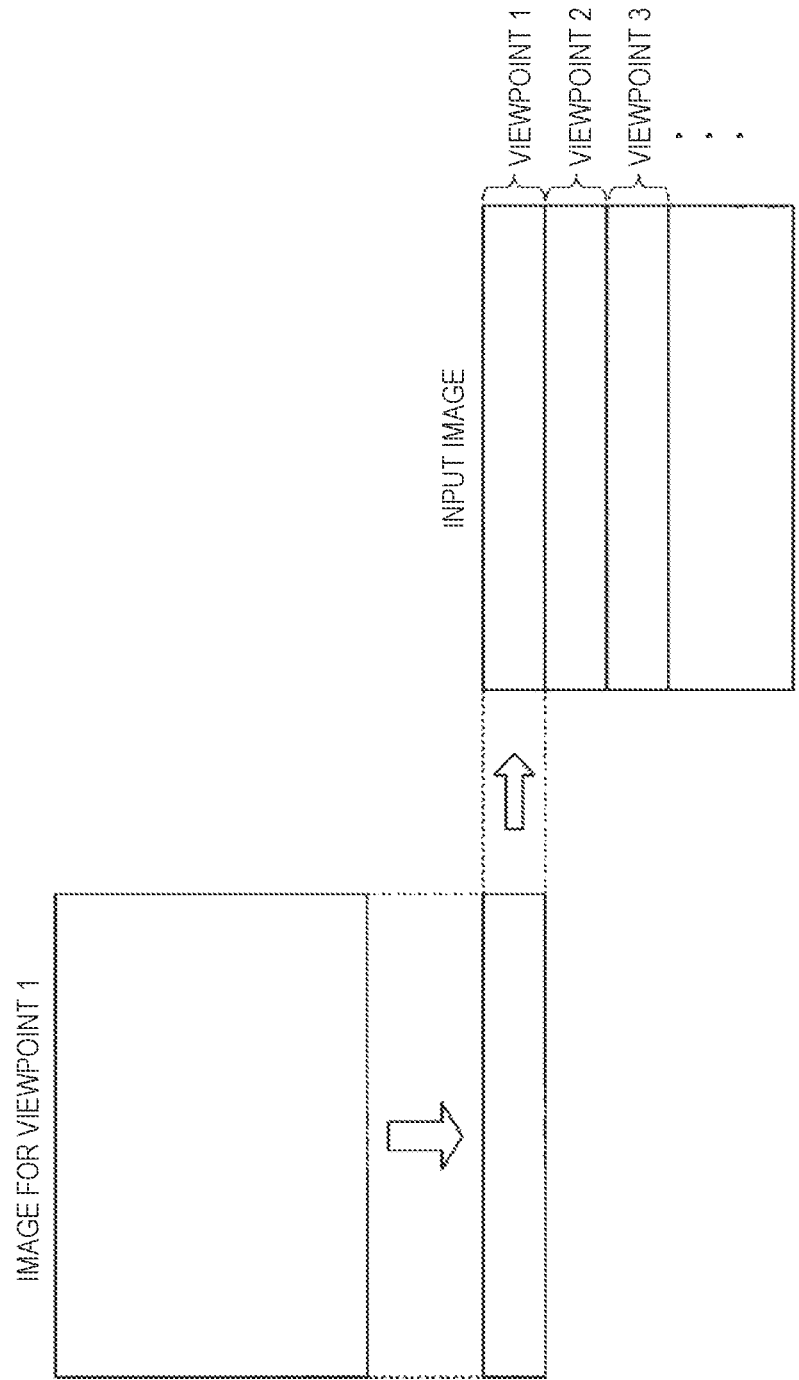
FIG. 5 is a diagram for describing a linearly blended input image.
Figure 6:
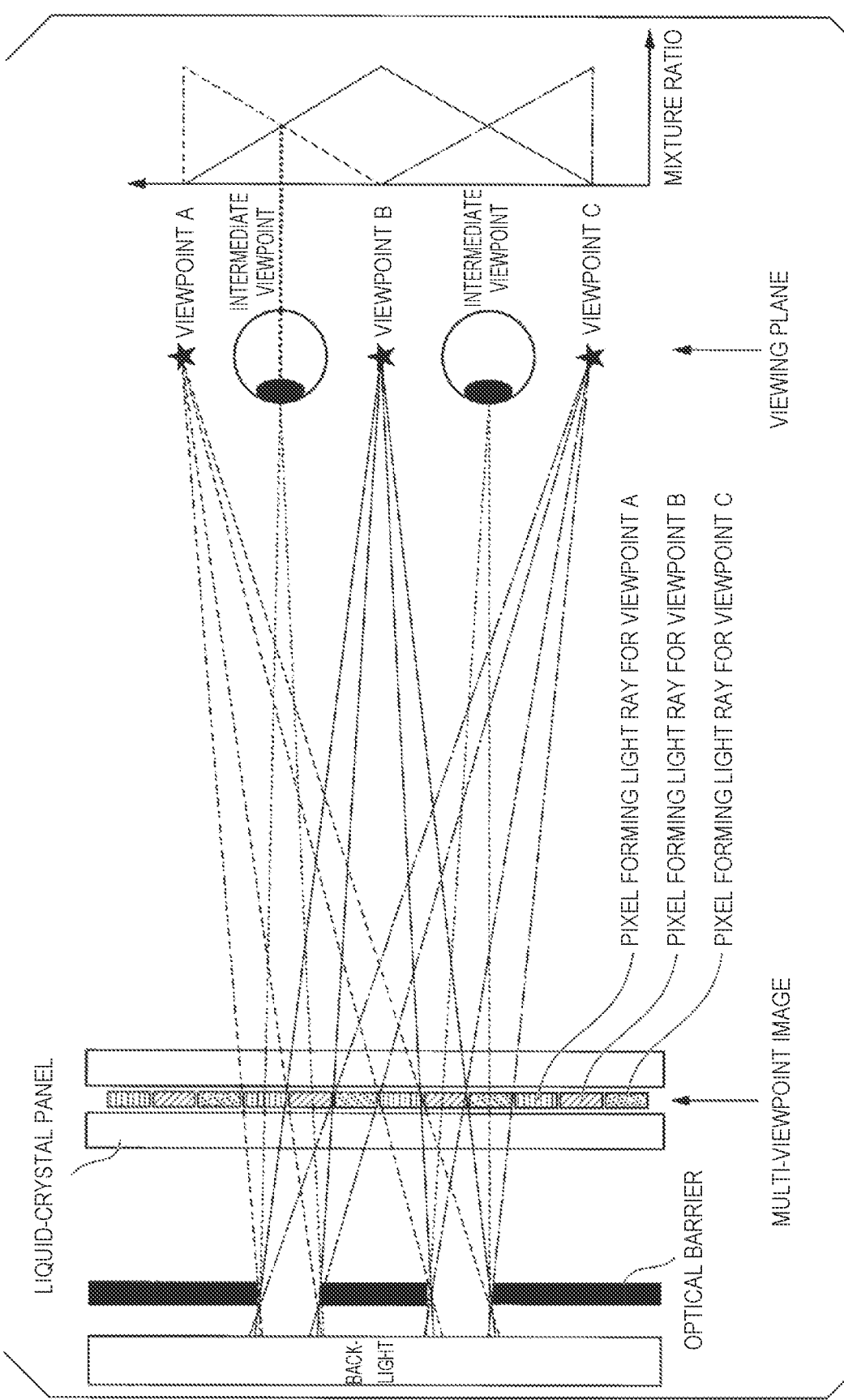
FIG. 6 is a diagram for describing a configuration of a linear blending display.

Here, the adjacent viewpoint predicted motion vector only needs to be one that indicates a pixel at a position that is the same as that of the coding target block, in an adjacent viewpoint. In other words, an adjacent viewpoint predicted motion vector is, for example, a vector including a horizontal component of 0 and a vertical component corresponding to a pixel width for one viewpoint, in the composed input image illustrated in FIG. 5.

Where two spatial direction predicted motion vectors have already been stored in the predicted motion vector storage unit 15, the adjacent viewpoint motion vector generation unit 124 overwrites one of the two spatial direction predicted motion vector, whichever is lower in priority (for example, a spatial direction predicted motion vector generated later), with the generated adjacent viewpoint predicted motion vector (step S208).

Then, the adjacent viewpoint prediction processing by the adjacent viewpoint motion vector generation unit 12 ends.

In this way, in adjacent viewpoint prediction, if three conditions, a current picture is referred to (reference picture number is 0), a coding target block is not a block included in an image corresponding to an uppermost viewpoint and spatial direction predicted motion vector(s) do not refer to an adjacent viewpoint, are met, an adjacent viewpoint predicted motion vector is generated.

Note that from among the three conditions above, the third condition (that is, the condition that spatial direction predicted motion vector(s) do not refer to an adjacent viewpoint) may be omitted. However, in general, in IBC, motion vectors of blocks adjacent to each other tend to coincide with each other. Therefore, in a case where a motion vector of an adjacent block indicates another viewpoint and does not indicate a same position in an adjacent viewpoint, if such case is prioritized, a smaller predictive residual can be expected, and thus it is desirable to add the third condition.

Referring back to FIG. 3, description will be provided.

Next, the control unit 10 determines whether or not the number of predicted motion vectors stored in the predicted motion vector storage unit 15 is less than two step S03). If the control unit 10 determines that the number of predicted motion vectors stored in the predicted motion vector storage unit 15 is not less than two (that is, two (there are a plurality of predicted motion vectors)) (step S03: NO), the predicted motion vector storage unit 15 outputs the stored two predicted motion vectors as predicted motion vector candidates (step S07).

On the other hand, if the control unit 10 determines that the number of predicted motion vectors stored in the predicted motion vector storage unit 15 is less than two (step S03: YES), the temporal direction motion vector prediction unit 13 performs temporal direction motion vector prediction based on the coding target block information and an other picture block motion vector (step S04). Consequently, a maximum of one temporal direction predicted motion vector is generated. The temporal direction motion vector prediction unit 13 stores the generated temporal direction predicted motion vector in the predated motion vector storage unit 15.

Next, the control unit 10 determines whether or not the number of predicted motion vectors stored in the predicted motion vector storage unit 15 is less than two (step S05). If the control unit 10 determines that the number of predicted motion vectors stored in the predicted motion vector storage unit 15 is not less than two (that is, two), the predicted motion vector storage unit 15 outputs the stored two predicted motion vectors as predicted motion vector candidates (step S07).

On the other hand, if the control unit 10 determines that the number of predicted motion vectors stored in the predicted motion vector storage unit 15 is less than two, the zero vector generation unit 14 adds a zero vector until the number of vectors (predicted motion vector candidates) stored in the predicted motion vector storage unit 15 becomes two (step S06). Next, the predicted motion vector storage unit 15 outputs the stored two predicted motion vectors as predicted motion vector candidates (step S07).

Then, the operation of the prediction device 1 based on the flowchart in FIG. 3 ends.

As described above, the prediction device 1 according to an embodiment of the present invention predicts a motion vector of a coding target block in coding of an image (composite image) formed by combining multiple viewpoint images. The prediction device 1 includes: the predicted motion vector storage unit 15 (storage unit) that stores a predicted motion vector candidate (first predicted motion vector); and the adjacent viewpoint motion vector generation unit 12 (update unit) that if a predetermined condition is met, generates an adjacent viewpoint motion vector (second predicted motion vector) that is a vector indicating a pixel in an adjacent viewpoint, the pixel being located at a position that is same as a position of the coding target block, and stores the adjacent viewpoint motion vector in the predicted motion vector storage unit 15.

In other words, the prediction device 1 according to an embodiment of the present invention adds a motion vector of a block in an image for an adjacent viewpoint, the block being located at a position that is the same as, that of a coding target block, as a predicted vector. Because of including the above configuration, the prediction device 1 can compress a video image formed by combining multiple viewpoint video images, more efficiently than the conventional coding methods.

A part or an entirety of the prediction device 1 in the above-described embodiment may be implemented by a computer. In such case, the part or the entirety of the prediction device 1 may be implemented by recording a program for implementing functions of the part or the entirety of the prediction device 1 on a computer-readable recording medium and causing a computer system to read and execute the program recorded on the recording medium. Note that the "computer system" mentioned here includes an OS and hardware pieces such as peripheral devices. Also, the "computer-readable recording medium" refers to a portable medium such as a flexible disk, a magnetooptical disk, a ROM or a CD-ROM or a storage device such as a hard disk incorporated in the computer system. Furthermore, the "computer-readable recording medium" may include one that dynamically holds a program for a short period of time like a communication wire in a case where a program is transmitted via a network such as the Internet or a communication channel such as a telephone line and one that holds the program for a certain period of time like a volatile memory inside a computer system that serves as a server or a client in such case. Also, the program may be one intended to implement some of the above functions, may be one that can provide the aforementioned functions in combination with the program already recorded in the computer system or may be implemented using hardware such as a PLD (programmable logic device) or an FPGA (field programmable gate array).

Although embodiments of the present invention have been described above with reference to the drawings, the above embodiments are mere examples of the present invention and it is clear that the present invent ion is not limited to the above embodiments. Therefore, addition, omission, replacement and other changes of components are possible without departing from the technical idea and spirit of the present invention.

REFERENCE SIGNS LIST 1 prediction device
10 control unit
11 spatial direction motion vector prediction unit
12 adjacent viewpoint motion vector generation unit
13 temporal direction motion vector prediction unit
14 zero vector generation unit
15 predicted motion vector storage unit
121 reference picture condition determination unit
122 coding target block coordinate condition determination unit
123 spatial direction predicted motion vector condition determination unit
124 adjacent viewpoint motion vector generation unit

The invention claimed is:

1. A prediction device for predicting a motion vector of a coding target block in coding of a composite image formed by combining multiple viewpoint images, the prediction device comprising:
   a storage unit that stores a first predicted motion vector indicating a predicted motion vector candidate;
   a processor; and
   a storage medium having computer program instructions stored thereon, when executed by the processor, perform to:
   if a predetermined condition is met, generates a second predicted motion vector from the composite image and stores the second predicted motion vector in the storage unit, where the second predicted motion vector is a vector indicating a pixel in an adjacent viewpoint, the pixel being located at a position that is same as a position of the coding target block,
   wherein the predetermined condition is a condition that the coding target block is not a block included in an uppermost viewpoint in the composite image, and a condition that a viewpoint corresponding to a block that an adjacent block refers to for generating the first predicted motion vector and a viewpoint corresponding to an image to which the coding target block belongs are not adjacent to each other.

2. A non-transitory computer-readable medium having computer-executable instructions that, upon execution of the instructions by a processor of a computer, cause the computer to function as the prediction device according to claim 1.

3. A prediction device for predicting a motion vector of a coding target block in coding of a composite image formed by combining multiple viewpoint images, the prediction device comprising:
a storage unit that stores a first predicted motion vector indicating a predicted motion vector candidate;
a processor; and
a storage medium having computer program instructions stored thereon, when executed by the processor, perform to:
if there are a plurality of the first predicted motion vectors stored in the storage unit, generates a second predicted motion vector that is a vector indicating a pixel in an adjacent viewpoint, the pixel being located at a position that is same as a position of the coding target block, and overwrites one of the first predicted motion vectors, whichever is lower in priority, with the second predicted motion vector.

4. The prediction device according to claim 3, wherein the predetermined condition is a condition that the composite image in which the coding target block is included and a composite image referred to for generating the second predicted motion vector are a same composite image.

5. The prediction device according to claim 4, wherein the predetermined condition is a condition that the coding target block is not a block included in an uppermost viewpoint in the composite image.

6. The prediction device according to claim 5, wherein the predetermined condition is a condition that a viewpoint corresponding to a block that an adjacent block refers to for generating the first predicted motion vector and a viewpoint corresponding to an image to which the coding target block belongs are not adjacent to each other.

7. A prediction method for predicting a motion vector of a coding target block in coding of a composite image formed by combining multiple viewpoint images, the prediction method comprising:
a storage step of storing a first predicted motion vector indicating a predicted motion vector candidate; and
an update step of if a predetermined condition is met, generating a second predicted motion vector from the composite image and stores the second predicted motion vector in the storage unit, where the second predicted motion vector is a vector indicating a pixel in an adjacent viewpoint, the pixel being located at a position that is same as a position of the coding target block,
wherein the predetermined condition is a condition that the coding target block is not a block included in an uppermost viewpoint in the composite image, and a condition that a viewpoint corresponding to a block that an adjacent block refers to for generating the first predicted motion vector and a viewpoint corresponding to an image to which the coding target block belongs are not adjacent to each other.

8. The prediction method according to claim 7, wherein the predetermined condition is a condition that the composite image in which the coding target block is included and a composite image referred to for generating the second predicted motion vector are a same composite image.

9. The prediction method according to claim 8, wherein the predetermined condition is a condition that the coding target block is not a block included in an uppermost viewpoint in the composite image.

10. The prediction method according to claim 9, wherein the predetermined condition is a condition that a viewpoint corresponding to a block that an adjacent block refers to for generating the first predicted motion vector and a viewpoint corresponding to an image to which the coding target block belongs are not adjacent to each other.

\* \* \* \* \*